United States Patent [19]

Rollins

[11] Patent Number: 4,898,393
[45] Date of Patent: Feb. 6, 1990

[54] WEAR COMPENSATING STEM SEALING APPARATUS

[75] Inventor: Marvin J. Rollins, Muncie, Ind.

[73] Assignee: Maxon Corporation, Muncie, Ind.

[21] Appl. No.: 210,372

[22] Filed: Jun. 22, 1988

[51] Int. Cl.$^4$ .............................................. F16J 15/16
[52] U.S. Cl. ........................................ 277/27; 277/58
[58] Field of Search ............... 277/112, 102, 105, 181, 277/184, 193, 187, 59, 110, 27, 58, 103; 251/214, 900

[56] References Cited

U.S. PATENT DOCUMENTS

| | | | |
|---|---|---|---|
| B 517,668 | 4/1976 | Evens | 277/112 |
| 1,958,221 | 5/1934 | Wilcox | 277/59 |
| 2,000,688 | 5/1935 | Burr et al. | 277/112 |
| 3,186,724 | 6/1965 | Wheatley | 277/59 |
| 3,831,900 | 8/1974 | Matousek et al. | 251/214 |
| 3,940,151 | 2/1976 | Phillips | 277/27 |
| 4,094,512 | 6/1978 | Buck | 277/27 |
| 4,168,936 | 9/1979 | Scheller et al. | 277/27 |
| 4,192,519 | 3/1980 | Buggele | 277/115 |
| 4,363,465 | 12/1982 | Morrill | 277/125 |
| 4,394,023 | 7/1983 | Hinojosa | 277/105 |
| 4,440,404 | 4/1984 | Roach et al. | 277/124 |
| 4,500,092 | 2/1985 | Uomala et al. | 277/192 |
| 4,516,752 | 5/1985 | Babbitt et al. | 251/214 |
| 4,765,632 | 8/1988 | D'Alterio | 277/79 |

FOREIGN PATENT DOCUMENTS 277474 7/1987 European Pat. Off. .............. 277/27
3204553 8/1983 Fed. Rep. of Germany ...... 277/102

OTHER PUBLICATIONS

St. Amour, "How Compression Set Affects O-Ring Selection", Hydraulics and Pneumatics (4/66), pp. 132–134.

Primary Examiner—William A. Cuchlinski, Jr.
Assistant Examiner—Jeffrey J. Hohenshell
Attorney, Agent, or Firm—Cook & Egan, Ltd.

[57] ABSTRACT

The present invention is directed to an improved wear compensating stem sealing apparatus. The elements thereof include a unitarily formed or separably formed O-ring separator disposed upon a valve stem. A first, or "wiper" O-ring is disposed on the stem in a space provided on the O-ring separator. A second (and in some embodiments, a third) O-ring is disposed about the stem in a similar space on the O-ring separator above the level of the first O-ring. The second and/or third O-ring provide a subsequent sealing of the stem from pressurized fluid migrating upwardly upon wear of the first O-ring. The first O-ring may be made of a material which will wear more rapidly and/or wipe more efficiently than the second and/or third O-ring, or provide less radial squeeze, such that the second and/or third O-ring is subjected to increased compressive pressure from the pressurized fluid upon the wearing of the first O-ring.

8 Claims, 3 Drawing Sheets

WEAR COMPENSATING STEM SEALING APPARATUS

BACKGROUND OF THE INVENTION

The present invention is generally directed to a sealing apparatus, and more particularly is directed to an improved wear compensating stem sealing apparatus.

In the prior art, different techniques and structures have been utilized to seal a shaft from the migration of fluidic substances, including liquids, up the shaft, and thereby to contaminate the interior structure of housings, such as more particularly valve housings.

Certain of these prior art devices have necessarily included increasing complexity, which has also rendered repair in the field difficult, and in some instances, virtually impossible. Under such circumstances, the cost of manufacturing, assembling, purchasing and servicing such devices has also been inordinately high. Furthermore, other prior art structures have required substantial amounts of internal machining in order to create a functional device, which has yet further increased the cost of manufacturing and maintaining such devices.

Other prior art structures have been of such structure that molding and machining manufacturing techniques were necessary, and less expensive techniques such as powdered metal techniques were not possible. In regard to such prior art molded and machined parts, surface characteristics could not be as easily controlled as they can by utilizing powdered metal fabrication techniques, which afforded less flexibility of design and application.

Other prior art sealing devices have been subject to rapid and excessive wear, which has necessitated increased maintenance efforts, and with increasing cost and inefficiency of use.

In view of the material disadvantages and deficiencies of the prior art, it is one substantial object of the improved wear compensating stem sealing apparatus of the present invention to provide apparatus which will materially alleviate the above disadvantages and deficiencies of prior art devices.

Additional advantages and objects of the present invention will become apparent to those of ordinary skill in the art upon review of the following summary of the invention, brief description of the drawing, detailed description of preferred embodiments, appended claims, and accompanying drawing.

SUMMARY OF THE INVENTION

The present invention is directed to an improved wear compensating stem sealing apparatus, and functions to maintain and prolong the effective life of the seals for such a stem, such as of the type used in connection with valves, to prevent migration of pressurized fluidic substances up such a stem which would contaminate the interior of the apparatus.

The improved wear compensating stem sealing apparatus of the present invention includes an elongated stem having a longitudinal dimension. In preferred embodiments, an O-ring separator is disposed about said stem and includes a first O-ring contact surface at the inner diameter thereof. The first O-ring is disposed snugly about such stem and in contact with the first O-ring contact surface of the O-ring separator. The first O-ring serves as a "wiper", and in preferred embodiments may have a radial squeeze or be formed of such a material which will permit continuation of its wiping function even after wear of such first O-ring and prior to wear of other accompanying O-rings.

A second O-ring is disposed at an upper portion of the inner diameter of the O-ring separator and about the stem. When such first O-ring wears more rapidly than the second O-ring, or the radial squeeze thereof becomes decreased, the second O-ring is subject to compressive pressure from the pressurized fluid migrating up the stem, which increases the radial squeeze on the second O-ring. As the stem ring is free to move longitudinally on the stem, the third O-ring is subjected to similar compressive pressure, and which likewise increases radial squeeze thereon. Of course, additional stem rings and accompanying O-rings may be disposed upon the stem.

DETAILED DESCRIPTION OF PREFERRED EMBODIMENTS

Figure 1:
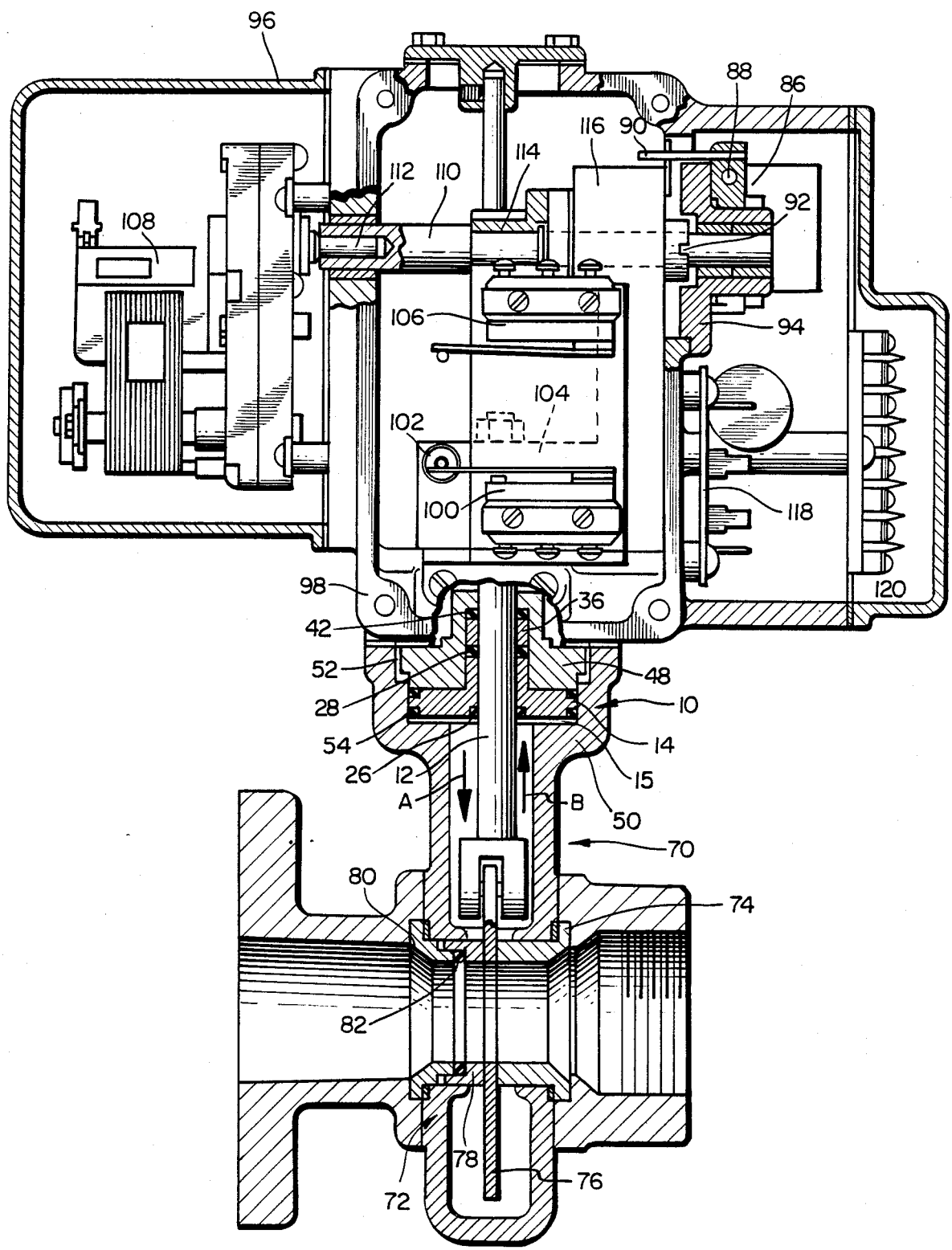
FIG. 1 is a longitudinal cross-sectional view of one embodiment of the improved wear compensating stem sealing apparatus of the present invention shown as suitable for use in connection with a valve structure, and showing the first and second internal O-rings disposed about the valve stem and in connection with the O-ring separator, and also showing the stem ring and a third internal O-ring in connection therewith, all of which elements are maintained in operative configuration by means of the bonnet, and further showing additional parts of a typical valve structure.

The improved wear compensating stem sealing apparatus of the present invention, and as described in more detail hereinbelow, functions to maintain and prolong the effective life of seals, such as preferably O-rings, which seal a stem and prevent the migration of pressurized fluids up the stem and thereby preventing contamination of the internal functioning parts of the apparatus using the stem. The improved wear compensating stem sealing apparatus of the present invention is particularly applicable to various valve structures.

The improved wear compensating stem sealing apparatus of the present invention includes an elongated stem having a longitudinal dimension thereon. An O- ring separator is provided and which is substantially annular shaped in its transverse cross-section. Such O-ring separator further has an opening at the inner diameter thereof for disposition of the stem therethrough. One form of the O-ring separator also has a first O-ring contact surface at a lower portion of the inner diameter of the O-ring separator, and a second O-ring confinement means at an upper portion of the inner diameter of the O-ring separator.

In such embodiments, the first O-ring is disposed snugly about the stem and in contact with the first O-ring contact surface of the O-ring separator for initially sealing, and/or "wiping", a pressurized fluid, which may preferably include liquids, from the surface of the stem preventing upward migration on the stem. Upon multiple cycles of the valve, the first O-ring will begin to wear, such that it no longer serves as a seal, per se. However, such first O-ring will continue to serve in its capacity as a "wiper" for many additional cycles.

A second or "back-up" O-ring is disposed snugly about the stem and has a selected radial squeeze. Such second O-ring is disposed in contact with the second O-ring confinement means of the O-ring separator to provide subsequent sealing of the stem from the pressurized fluid and to further prevent the migration of such pressurized fluid upwardly upon the stem.

The first O-ring has a selected radial squeeze and/or is formed of such material as to permit more efficient wiping than the second O-ring, thereby to subject the O-ring within the O-ring confinement means to compressive pressure from the pressurized fluid when the first O-ring wears sufficiently. The result of such pressure from pressurized fluid migrating beyond the first O-ring is to increase the radial squeeze on the second O-ring, and thereby to seal the stem from any further migration upwardly of the pressurized fluid.

In the improved wear compensating stem sealing apparatus of the present invention the O-ring separator may preferably have a substantial longitudinal thickness to separate the first and second O-rings at a selected distance upon the stem. This form of O-ring separator also preferably comprises a relatively flat disc-shaped body and a hollow neck portion of substantial longitudinal length disposed at the inner diameter thereof for accommodating the stem therewithin. Such parts may be unitarily or separately formed.

In preferred embodiments, a stem ring may also preferably be disposed about the stem, above and in contact with the second O-ring at the lower radial surface of the stem ring. In some preferred embodiments, provided therewith is a third O-ring compression surface thereon, with a third O-ring disposed snugly about the stem and having a selected radial squeeze and third O-ring compression means. Such stem ring and related elements function to increase the stem sealing capability of the apparatus when the first O-ring wears sufficiently to permit migration of the pressurized fluid upwardly upon the stem. In that event, pressure is exerted upon the second O-ring, and that pressure is then transmitted upwardly against the stem ring, which in turn is urged upwardly to further compress the third O-ring within a third O-ring compression means, and thereby to provide yet further supplemental stem sealing capacity to the apparatus.

In preferred embodiments, the first and second O-rings have a selected radial squeeze and the radial squeeze of the second O-ring and third O-ring, and any additional O-rings, may be less than that of the first O-ring to preserve the effective sealing life and to prevent premature wear. Such additional O-rings may be necessary for adequate sealing especially where such pressurized fluid is a gas.

A bonnet may preferably be disposed about the stem. In some embodiments, the bonnet may be formed from powdered metal, such as stainless steel or other materials, which may then preferably be infiltrated with copper metal to "seal" the pores thereof, although Teflon may be used for sealing such pores in alternative preferred embodiments. Of course, similar manufacturing techniques may be utilized in the production of the O-ring separator and the stem ring.

The bonnet is disposed within a body, which may preferably comprise a valve body. The stem in preferred embodiments is a valve stem which travels upon valve actuation in the above longitudinal direction. In these embodiments, the bonnet and the valve body cooperate to confiningly secure the O-rings and the O-ring separator therewithin. Also, the valve stem is substantially cylindrical in shape. The bonnet and the valve body are mutually threaded in some preferred embodiments to effectuate the confining securement. In other embodiments, the bonnet is bolted onto the valve body to fix an immovable top surface against which the O-rings may be compressed.

Bumper means are preferably disposed beneath, and in some embodiments partially internally of, the O-ring separator to absorb shock transmitted thereto during actuation of the valve. Such bumper means are preferably carried by the valve body.

The O-ring separator may further be disposed within such a valve body and includes sealing means disposed at the exterior diameter thereof for sealing the exterior within the valve body.

Supplemental sealing means may also be provided in preferred embodiments and be disposed between the bonnet and the exterior surface of the O-ring separator for effectuating sealing from the pressurized fluid therebetween. Such pressurized fluid may comprise a pressurized liquid.

In preferred embodiments of the improved wear compensating stem sealing apparatus of the present invention, the first O-ring further functions as a wiper means upon the stem substantially to remove the pressurized fluid, or liquid, and potential wear particles, from the stem during movement of the stem in the upward longitudinal direction.

In other preferred embodiments the O-ring separator of the present invention may further include a generally annular shaped lubrication groove disposed circumferentially about the stem. Such lubrication groove may be preferably disposed to contain lubrication between the first O-ring and the second O-ring. Such lubrication groove is preferably substantially trapezoidal in longitudinal cross-sectional shape on each side of the stem. Such lubrication groove shape further includes a lubrication collection sump at the bottom portion of the lubrication groove. The lubrication sump preferably projects downwardly at approximately 15° to the horizontal, although other shaped configurations are contemplated as being equivalent in function. Similarly, the stem ring may also in certain alternative preferred embodiments include a generally annular shaped lubrication groove disposed about such stem. Also similarly, such stem lubrication groove is disposed to contain lubrication between the first O-ring and the second O-ring. Such lubrication groove likewise may be substantially trapezoidal in cross-sectional shape on each side of the stem, and includes a lubrication collection sump at the bottom portion of the lubrication groove. Such lubrication sump also may be preferably angled downwardly at approximately 15° to the horizontal. In preferred embodiments of the improved wear compensating stem sealing apparatus of the present invention, the radial squeeze upon each of such first, second and third O-rings may in some embodiments be of the order of an approximately 10% radial squeeze.

In some preferred embodiments, the O-ring separator elements may be formed in separate pieces. Specifically, the O-ring separator element may comprise at least one interiorly disposed annular O-ring separator element and a separate separator confining element means for disposition about and exteriorly of the interiorly disposed annular O-ring separator element. The separator confinement means may include an exteriorly disposed O-ring separator holding sleeve means. Such sleeve means in preferred embodiments substantially confiningly holds both the O-ring separator and the stem ring. In some preferred embodiments, the stem ring disposed above the O-ring separator neck element and the interiorly disposed annular O-ring separator neck element may be essentially identical annular-shaped thimbles for convenience of production and installation.

The stem ring may be made of a porous metal material, and then impregnated with an oil lubricant to serve as a lubricant reservoir. The density of such porous stem ring embodiments may be in the range of approximately 50% to 90% the density of solid metal.

Referring now to the drawing and to FIG. 1 in particular, the improved wear compensating stem sealing apparatus generally 10 of the present invention, and as described in more detail in slightly modified form hereinbelow with regard also to FIGS. 2, 3 and 4, functions to maintain and prolong the effective life of seals, such as preferably O-rings, which seal a stem or shaft and prevent the migration of pressurized liquids up the stem and thereby preventing contamination of the internal functioning parts of the apparatus using the stem. As shown in FIG. 1 as one preferred application of use, the improved wear compensating stem sealing apparatus 10 of the present invention is particularly applicable to various valve structures, as depicted therein.

The improved wear compensating stem sealing apparatus 10 of the present invention includes an elongated stem 12 having a longitudinal dimension thereon and directions of longitudinal reciprocal movement designated by Arrows A,B. An O-ring separator 14 is provided, and which is substantially annular shaped in its transverse cross section. Such O-ring separator 14 further has an opening 16 at the inner diameter 18 thereof for disposition of stem 12 therethrough. O-ring separator 14 also has a first O-ring contact surface 20 at a lower portion 21 of inner diameter 18 of O-ring separator 14, and a second O-ring confinement means 22 at the upper portion 24 of inner diameter 18 of O-ring separator 14.

First O-ring 26 is disposed snugly about stem 12 and in contact with first O-ring contact surface 20 of O-ring separator 14 for initially sealing, or "wiping", pressurized fluid, which may preferably include liquids, from migrating upwardly on stem 12. Disposed beneath O-ring separator 14 is bumper plate 15. As shown in FIG. 4, bumper plate 15 may have an interior neck portion 17 thereon.

Second O-ring 28 is disposed snugly about stem 12 and has a selected radial squeeze. Such second O-ring 28 is disposed in contact with second O-ring confinement means 22 of O-ring separator 14 to provide subsequent sealing of stem 12 from the pressurized fluid and to further prevent the migration of such pressurized fluid upwardly upon stem 12.

First O-ring 26 has a radial squeeze and/or is formed of such material as to permit wearing more rapidly than second O-ring 28, thereby to subject second O-ring 28 within second O-ring confinement means 22 to compressive pressure from the pressurized fluid when first O-ring 26 wears sufficiently. The result of such pressure from pressurized fluid migrating beyond first O-ring 26 is to increase the radial squeeze on second O-ring 28, and thereby to seal stem 12 from any further migration upwardly of the pressurized fluid.

In the improved wear compensating stem sealing apparatus 10 of the present invention, O-ring separator 14 may preferably have a substantial longitudinal thickness to separate first and second O-rings 26,28 at a selected distance upon stem 12. As shown in FIG. 2 in particular, O-ring separator 14 also may preferably comprise a relatively flat disc-shaped body 32 and a hollow neck portion 34 of substantial longitudinal length disposed at inner diameter 18 thereof for accommodating stem 12 therewithin. As shown in FIG. 4, the O-ring separator 14 may be formed separably. In such embodiments, the O-ring separator disc-shaped body 32 may include an exteriorly disposed O-ring separator holding sleeve 33. In these embodiments, such discshaped body 32 with its O-ring separator holding sleeve 33 function to enclose an interior annular O-ring separator hollow neck portion 34.

In preferred embodiments, stem ring 36 may also preferably be disposed about stem 12, above and in contact with second O-ring 28 at the lower radial surface 38 of stem ring 36. Provided therewith is a third O-ring compression surface 40 thereon, with third O-ring 42 disposed snugly about stem 12 and having a selected radial squeeze by means of third O-ring compression surface 40. Such stem ring 36 and related elements function to increase the stem sealing capability of apparatus 10 when first O-ring 26 wears sufficiently to permit migration of the pressurized fluid upwardly upon stem 12. In that event, pressure is exerted upon second O-ring 28, and that pressure is transmitted upwardly against stem ring 36 which in turn is urged upwardly to further compress third O-ring 42, within third O-ring compression means comprising a third O-ring groove 46, and thereby to provide yet further supplement stem sealing capacity to apparatus 10.

In preferred embodiments, first and second O-rings 26, 28 have a selected radial squeeze and the radial squeeze of second O-ring 28 may in preferred embodiments be less than that of first O-ring 26 to preserve the effective sealing life and to prevent premature wear of second O-ring 28. Also in preferred embodiments, each of the first and third O-rings 26,42 has a selected radial squeeze, and the radial squeeze of third O-ring 42 may be less than that of the first O-ring 26, similarly to preserve the effective sealing life of third O-ring 42.

A bonnet 48 may preferably be disposed about stem ring 36 and at least neck portion 34 of O-ring separator 14. Such bonnet 48 is disposed within a body, which may be a valve body 50 and may be secured thereto by means well known to those skilled in the art, such as by threaded screw means, for example. Stem 12 in preferred embodiments is a valve stem, as shown in FIG. 1, which travels upon valve actuation in the above longitudinal direction of Arrows A,B. In these embodiments, bonnet 48 and valve body 50 cooperate to confiningly secure O-rings 26,28,42 of O-ring separator 14, and stem rig 36 therewithin. Also, stem 12 is preferably substantially cylindrical in shape, as shown. Bonnet 48 and valve body 50 may be mutually threaded in preferred embodiments at lateral portions 52, as shown in FIG. 1, to effectuate the confining securement.

Bumper plate 15 in the form of an elastomeric disc in some preferred embodiments is preferably disposed beneath O-ring separator 14 to absorb shock transmitted thereto during actuation of stem 12. Such bumper means 15 is preferably carried by valve body 50 in an appropriately shaped annular space.

O-ring separator 14 as disposed within valve body 50, includes sealing means disposed at the exterior diameter 56 thereof for sealing exterior O-rings 58,60 with valve body 50.

In preferred embodiments of the improved wear compensating stem sealing apparatus 10 of the present invention, first O-ring 26 further comprises a wiper means upon stem 12 substantially to remove the pressurized fluid or liquid from stem 12 during movement of stem 12 in the upward longitudinal direction of Arrow B.

Figure 2:
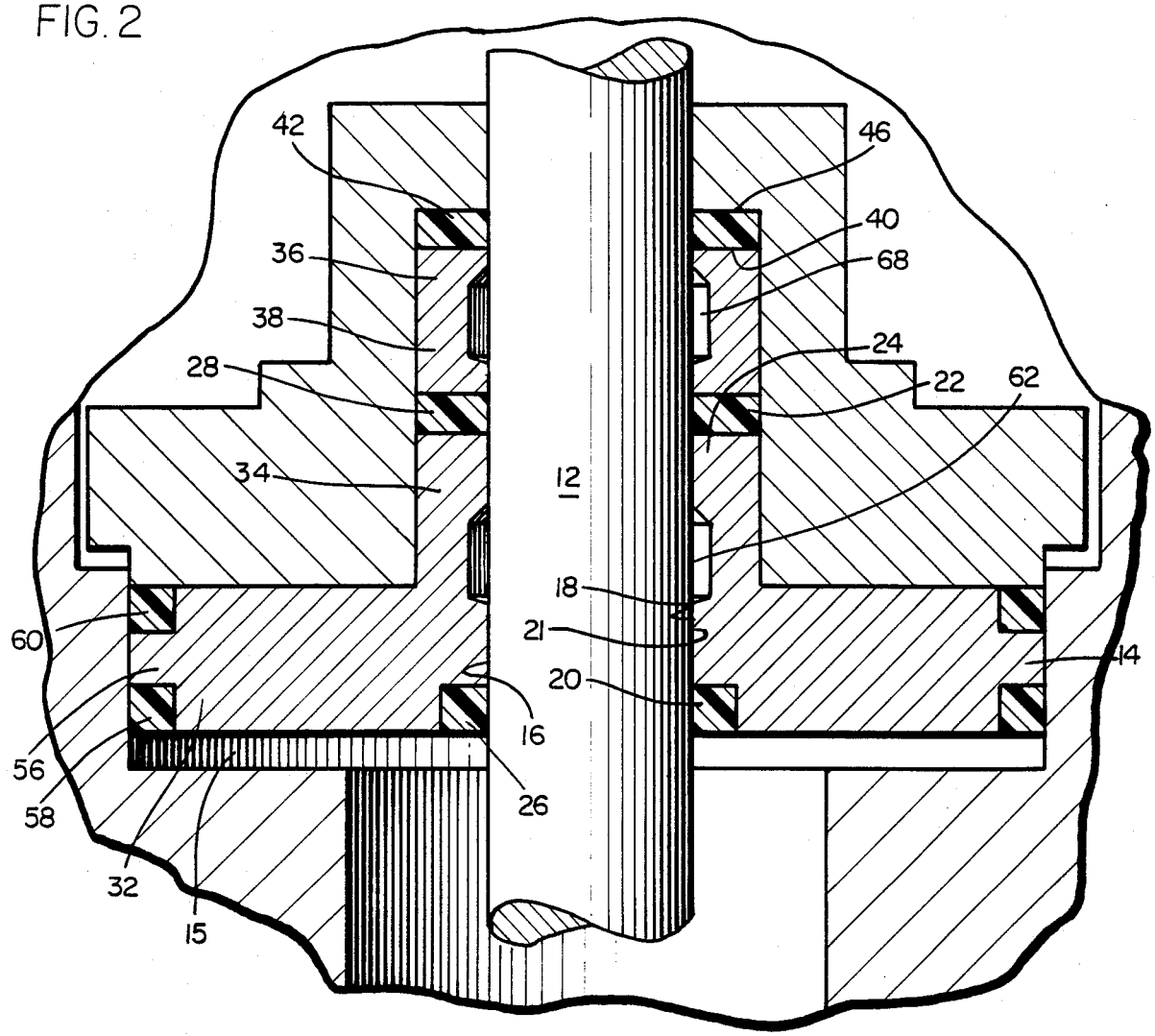
FIG. 2 is an enlarged transverse cross-sectional view of a slightly modified embodiment wherein such O-ring separator and such stem ring include respective lubrication grooves, and further showing the first or "wiper" O-ring, and disposed upwardly therefrom on the valve stem the area which becomes pressurized when the first O-ring begins to fail as a seal, and further depicting a stem ring, and a second or "back-up" O-ring for sealing which likewise has increased radial squeeze upon failure to seal of the first O-ring.
Figure 3:
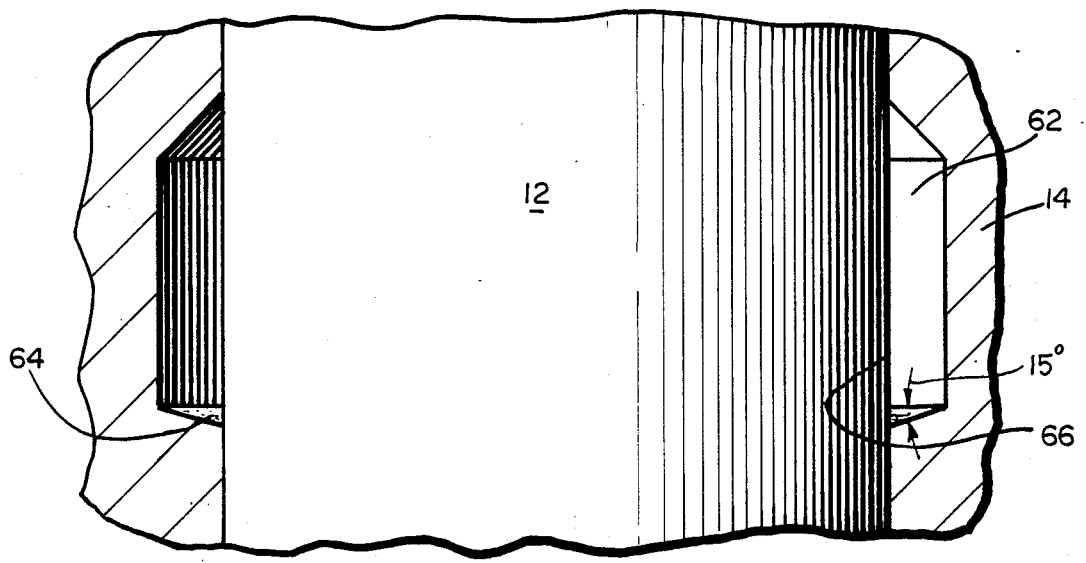
FIG. 3 is an enlarged longitudinal cross-sectional view through the stem to be sealed as depicted in FIG. 2, and further showing a modified form of an O-ring separator which has a lubrication groove circumferentially disposed about said stem.
Figure 4:
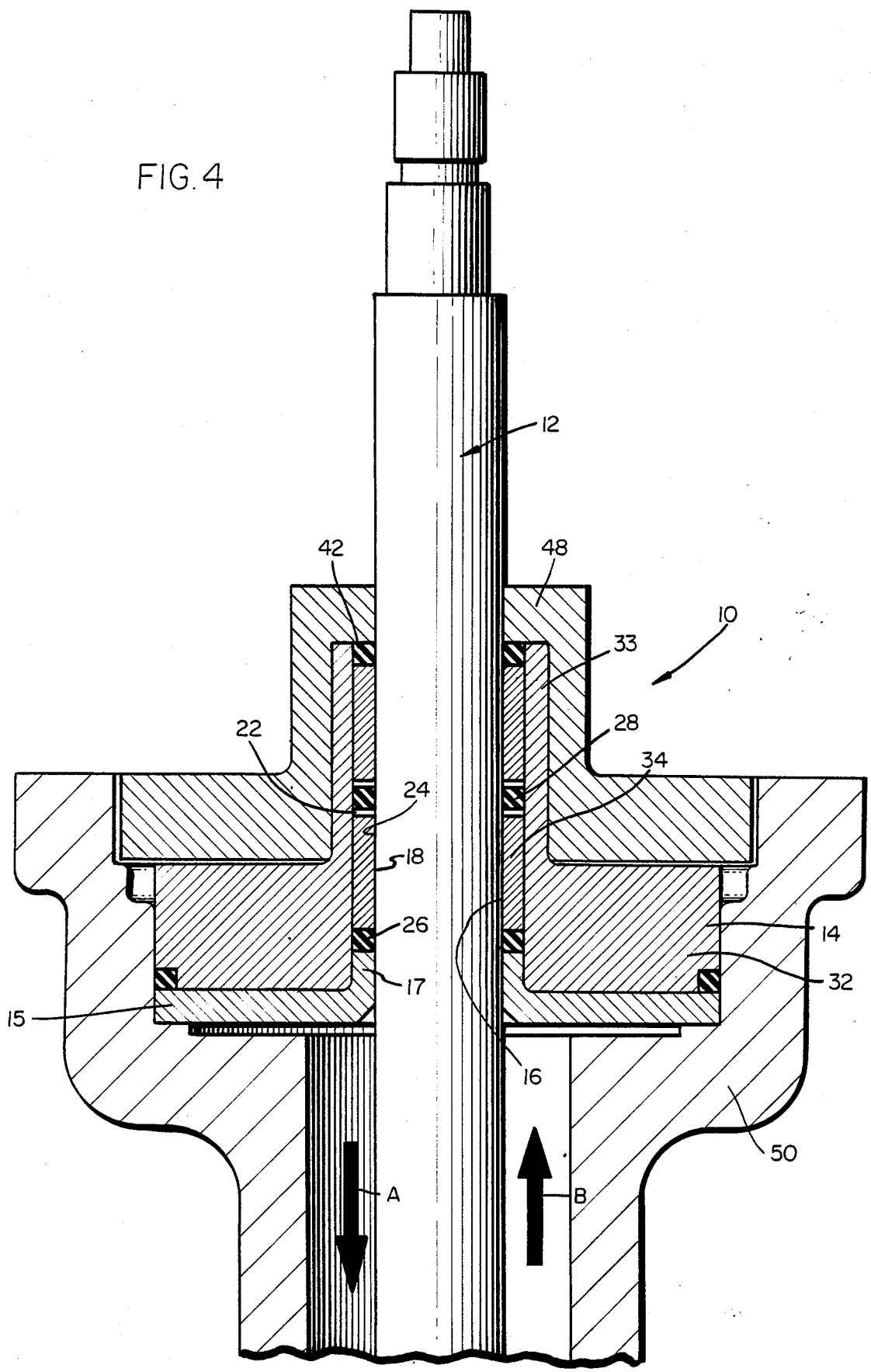
FIG. 4 is a longitudinal cross-sectional view through the stem to be sealed, and showing further embodiment of the improved wear compensating stem sealing apparatus of the present invention showing a yet different form of O-ring separator having the elements thereof formed in separate pieces, and having a separated interiorly disposed annular O-ring separator element disposed beneath a stem ring.

As shown particularly in FIGS. 2 and 3, O-ring separator 14 of the present invention may further include a generally annular shaped lubrication groove 62 disposed circumferentially about stem 12. Such lubrication groove 62 may be preferably disposed to contain lubrication between first O-ring 26 and second O-ring 28. As shown particularly in FIG. 3, such lubrication groove 62 is preferably substantially trapezoidal in longitudinal cross-sectional shape shown on each side of stem 12. Such lubrication groove 62 further includes a lubrication sump 64 at the bottom portion 66 of the lubrication groove 62. Lubrication sump 64 preferably angles downwardly at approximately 15° to the horizontal, as shown in FIG. 3.

Stem ring 36 may also in certain alternative preferred embodiments include a generally annular shaped stem lubrication groove 68 disposed about stem 12. Similarly, stem lubrication groove 68 is disposed to contain lubrication between second O-ring 28 and third O-ring 42. Such stem lubrication groove 68 likewise is substantially trapezoidal in cross-sectional shape shown on each side of stem 12, and includes a lubrication collection sump at the bottom portion of stem lubrication groove 68, as shown in FIG. 2 similar to the structure of lubrication groove 62, as also shown in FIG. 3. Such stem lubrication sump 68 also preferably angles downwardly at approximately 15° to the horizontal.

In preferred embodiments of the improved wear compensating stem sealing apparatus 10 of the present invention, the radial squeeze upon each of such first, second and third O-rings 26,28,42 may preferably be of the order of approximately 10% radial squeeze.

FIG. 1 also depicts other elements of one example of a valve structure which is usable in connection with the improved wear compensating stem sealing apparatus 10 of the present invention, although many other alternative structure may be usable therewith. In particular, valve generally 70 of FIG. 1 may include a pre-loaded valve follower sealing apparatus 72, which includes a valve seat 74 disposed within valve body 50 and in contact with valve guillotine 76. Valve guillotine 76 is supported for reciprocal movement within valve body 50 by stem 12. Valve follower ring 78 and mating flange insert 80 are further provided. Valve follower ring 78 and flange insert 80 preferably comprise a pair of hollow cylinders, one of which is snugly and slidingly disposed within the other, thereby to form an O-ring containing space 82 therebetween.

FIG. 1 also generally depicts means for diagnosing difficulties with valve 70, which means are of course separate and separable from the apparatus 10 hereof. Therein, diagnostic switch actuator bracket 86 carries spring plunger 88, clutch pin 90 and diagnostic switch actuator pin 92. This assembly rotates around clutch bearing housing 94. In usual operation, the spring plunger 88 has sufficient force to keep the assembly from moving when valve 70 is opened. When valve 70 becomes dirty and force above a threshold amount is required to open valve 70, the force of the rotary motion of the clutch is transferred through the clutch pin 90 and diagnostic switch actuator bracket 86 to overcome the spring loaded spring plunger 88. The diagnostic switch actuator pin 92 is moved against the diagnostic switch (not shown), which energizes a signal indicating that the valve requires attention.

Also, as depicted in the upper portion of FIG. 1, and within operational housing 96 at main base 98 and supported thereby, is valve open switch 100 having a switch actuator 102 and a spring retainer 104. Oppositely disposed therefrom is valve close switch 106. Motor 108 is shown driving pinion gear shaft 110 which is journaled in bearings 112, and drives pinion gear 114 and clutch 116. Also shown in FIG. 1 are volt circuit board and time delay circuit board 118 and terminal strips 120. These latter parts of valve 70 shown in FIG. 1 are not considered to be necessary parts per se of the present invention, as a wide variety of substitutions and different valve actuating and operating mechanisms and diagnosis systems may be utilized.

The term "O-rings" as used herein is intended to include not only the traditional annular-shaped seal having a substantially circular traverse cross-section, but also a wide variety of annular-shaped seals having other shaped cross-sectional areas, and further including spring-loaded, low-friction polymeric seals. Examples respectively include the extended range hydraulic seals produced by Microdot Company of Salt Lake City, Utah, and the various seals produced by Bal Seal Engineering Company, Inc. of Santa Anna, California.

The basic and novel characteristics of the improved apparatus of the present invention will be readily understood from the foregoing disclosure by those skilled in the art. It will become readily apparent that various changes and modifications may be made in the construction and arrangement of the improved apparatus of the present invention as set forth hereinabove without departing from the spirit and scope of the invention. Accordingly, the preferred and alternative embodiments of the present invention set forth hereinabove are not intended to limit such spirit and scope in any way.

What is claimed is:

1. An improved wear compensating stem sealing apparatus for maintaining and prolonging the effective life of the seal to prevent migration of a pressurized fluid upon a stem, said apparatus comprising:
   an elongated stem having a longitudinally dimension;
   an O-ring separator which is substantially annular shaped in transverse cross-section and having an opening at the inner diameter thereof for disposition of said stem therethrough and having a first O-ring contact surface thereon, and a second O-ring confinement means at an upper portion thereof;

a first O-ring disposed snugly about said stem and having a selected radial squeeze, and in contact with said first O-ring contact surface of said O-ring separator for initially sealing pressurized fluid from migrating upwardly upon said stem;

a second O-ring disposed snugly about said stem and having a selected radial squeeze and in contact with said second O-ring confinement means of said O-ring separator to provide subsequent sealing of said stem from such pressurized fluid migrating upwardly upon said stem;

said first O-ring over time providing less efficient sealing of the pressurized fluid than said second O-ring to subject said second O-ring within said second O-ring confinement means to compressive pressure from said pressurized fluid to provide an increased radial squeeze to said second O-ring upon said stem;

a stem ring disposed about said stem, above and in contact with said second O-ring at the lower radial portion of said stem ring surface and including a third O-ring compression surface thereon; and a third O-ring disposed snugly about said stem and having a selected radial squeeze, and a third O-ring compression means, whereby when said first O-ring permits migration of such pressurized fluid upwardly from said stem to exert pressure upon said second O-ring, which pressure is transmitted upwardly against said stem ring which in turn is urged upwardly to further compress said third O-ring compression means.

2. The improved wear compensating stem sealing apparatus of claim 1 wherein said stem ring includes a generally annular shaped stem lubrication groove disposed about said stem.

3. The improved wear compensating stem sealing apparatus of claim 2 wherein said stem lubrication groove is disposed to contain lubrication between said second O-ring and said third O-ring.

4. The improved wear compensating stem sealing apparatus of claim 3 wherein said stem lubrication groove is substantially trapezoidal in longitudinal cross sectional shape on each side of said stem.

5. The improved wear compensating stem sealing apparatus of claim 2 wherein said stem lubrication groove shape includes a lubrication collection sump at the bottom portion of said lubrication groove.

6. The improved wear compensating stem sealing apparatus of claim 5 wherein said stem lubrication sump angles downwardly at approximately 15° to the horizontal.

7. The improved wear compensating stem sealing apparatus of claim 1 wherein the radial squeeze of said third O-ring is less than that of said first O-ring to preserve the effective sealing life thereof.

8. The improved wear compensating stem sealing apparatus of claim 1 wherein the average radial squeeze of said O-rings is approximately 10%.

* * * * *